United States Patent
Modeel et al.

(10) Patent No.: US 11,068,243 B2
(45) Date of Patent: Jul. 20, 2021

(54) APPLICATION STACK BUILDER BASED ON NODE FEATURES

(71) Applicant: Red Hat, Inc., Raleigh, NC (US)

(72) Inventors: Subin Modeel, Boston, MA (US); Christoph Goern, Grasbrunn (DE); Fridolin Pokorny, Brno (CZ); Daniel Riek, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/430,578

(22) Filed: Jun. 4, 2019

(65) Prior Publication Data
US 2020/0387361 A1    Dec. 10, 2020

(51) Int. Cl.
G06F 8/70 (2018.01)
G06F 8/61 (2018.01)
G06F 8/41 (2018.01)

(52) U.S. Cl.
CPC ............... *G06F 8/41* (2013.01); *G06F 8/61* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 9,727,330 B2 | 8/2017 | Parees et al. | |
| 10,171,377 B2 | 1/2019 | Gao et al. | |
| 2017/0052772 A1* | 2/2017 | Chen | G06F 8/60 |
| 2017/0249141 A1* | 8/2017 | Parees | G06F 11/3668 |
| 2018/0025160 A1* | 1/2018 | Hwang | G06F 8/71 726/25 |
| 2018/0096002 A1* | 4/2018 | Nagaraja | G06F 16/22 |
| 2018/0146069 A1* | 5/2018 | Du | H04L 41/042 |
| 2019/0044806 A1 | 2/2019 | Sedayao | |
| 2019/0050680 A1 | 2/2019 | Waugh et al. | |

FOREIGN PATENT DOCUMENTS

CN    104618164 B    12/2018

OTHER PUBLICATIONS

Shashikant Ilager, Rajeev Wankar, Raghavendra Kune, and Rajkumar Buyya, *GPU PaaS Computation Model in Aneka Cloud Computing Environments*, Publ. 2018, Cloud Computing and Distributed Systems (CLOUDS) Laboratory School of Computing and Information Systems the University of Melbourne, Australia; School of Computer and Information Sciences University of Hyderabad; Advanced Data Processing Research Institute, Department of Space, Secunderabad, India, https://arxiv.org/ftp/arxiv/papers/1808/1808.06332.pdf.
Deployments, Publ 2019 by Red Hat, Inc., https://docs.openshift.com/enterprise/3.2/dev_guide/deployments.html#creating-a-deployment-configuration.

* cited by examiner

*Primary Examiner* — Daxin Wu
(74) *Attorney, Agent, or Firm* — Haynes and Boone, LLP (57) ABSTRACT

An example method includes creating a builder image on a node. The builder image is based on an application, a combination of application dependencies of the application, and a set of node features of the node. The method also includes determining a set of optimized libraries corresponding to the combination of application dependencies and to the node. The method further includes creating, based on the builder image and the set of optimized libraries, an application runtime container. The method also includes running the application and the set of optimized libraries in the application runtime container.

20 Claims, 6 Drawing Sheets

APPLICATION STACK BUILDER BASED ON NODE FEATURES

BACKGROUND

The present disclosure generally relates to computing devices, and more particularly to creating an application stack based on features of a node.

A container provides a platform to separate an application from the infrastructure running the application. The platform may provide a mechanism to run an application securely isolated in the container. A container is a self-contained execution environment and may share the kernel of the host operating system with other containers. The lightweight nature of containers, which run without the extra load of a hypervisor, may result in better use of hardware. Additionally, multiple containers may run on a machine.

BRIEF SUMMARY

Methods, systems, and techniques for creating an application stack are provided. An example method of creating an application stack includes creating a builder image on a node, the builder image being based on an application, a combination of application dependencies of the application, and a set of node features of the node. The method also includes determining a set of optimized libraries corresponding to the combination of application dependencies and to the node. The method further includes creating, based on the builder image and the set of optimized libraries, an application runtime container. The method also includes running the application and the set of optimized libraries in the application runtime container.

An example system for creating an application stack includes a stack builder that creates a builder image on a node. The builder image is based on an application, a combination of application dependencies of the application, and a set of node features of the node. The system also includes a deploy container that determines a set of optimized libraries corresponding to the combination of application dependencies and to the node. The system further includes an application runtime container that runs the application and the set of optimized libraries in the application runtime container. The deploy container creates, based on the builder image and the set of optimized libraries, the application runtime container.

An example machine-readable medium includes a plurality of machine-readable instructions that when executed by one or more processors is adapted to cause the one or more processors to perform a method including: creating a builder image on a node, the builder image being based on an application, a combination of application dependencies of the application, and a set of node features of the node; determining a set of optimized libraries corresponding to the combination of application dependencies and to the node; creating, based on the builder image and the set of optimized libraries, an application runtime container; and running the application and the set of optimized libraries in the application runtime container.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A container is an isolated processing space that can exist on top of a virtual machine or on top of actual hardware. The container may be viewed as a lightweight virtual machine that is used to create environments and may share the operating system with the host machine, preserving resources. In an example, a container may offer software that creates virtual environments mimicking a full virtual machine. A container may also offer other useful benefits.

A container image is a snapshot of a container and may contain a large amount of data. A container platform may be a container-based cloud service that connects different computer systems together. A container may be created on a node that abstracts hardware corresponding to the node. Reference to a node including hardware may refer to hardware that is abstracted by the node. A user may deploy an application on the container platform. In an example, the container platform may use labels for determining on which node to deploy the application. For example, the container platform may determine the label associated with a node and select a node for deploying the application if the node's label matches the label associated with deploying the application. In another example, the container platform selects a random node on which to deploy the application. In this example, the container platform may be unaware of the hardware corresponding to the node, and the application runtime container in which the application runs may not be specific to the hardware included in the node. For example, if a node includes a GPU, it may be desirable to ensure that the application or application dependency is GPU compatible. Additionally, the application running in the container may not be an optimized version of the application stack. In these cases, the application not execute at its full potential in terms of speed, memory usage, etc.

A solution to the problem of running an application on a randomly selected node and without being aware of the node's features may involve creating an application runtime container that is specific to the hardware architecture abstracted by the node and running the application inside this application runtime container. An example method of creating an application stack includes creating a builder image on a node, the builder image being based on an application, a combination of application dependencies of the application, and a set of node features of the node. The method also includes determining a set of optimized libraries corresponding to the combination of application dependencies and to the node. The method further includes creating, based on the builder image and the set of optimized libraries, an application runtime container. The method also includes running the application and the set of optimized libraries in the application runtime container.

The present disclosure provides techniques for creating an application stack. Unless specifically stated otherwise, as apparent from the following discussion, it is appreciated that throughout the description, discussions utilizing terms such as "determining," "storing," "creating," "receiving," "sending," "running," "executing," "compiling," "installing," "optimizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
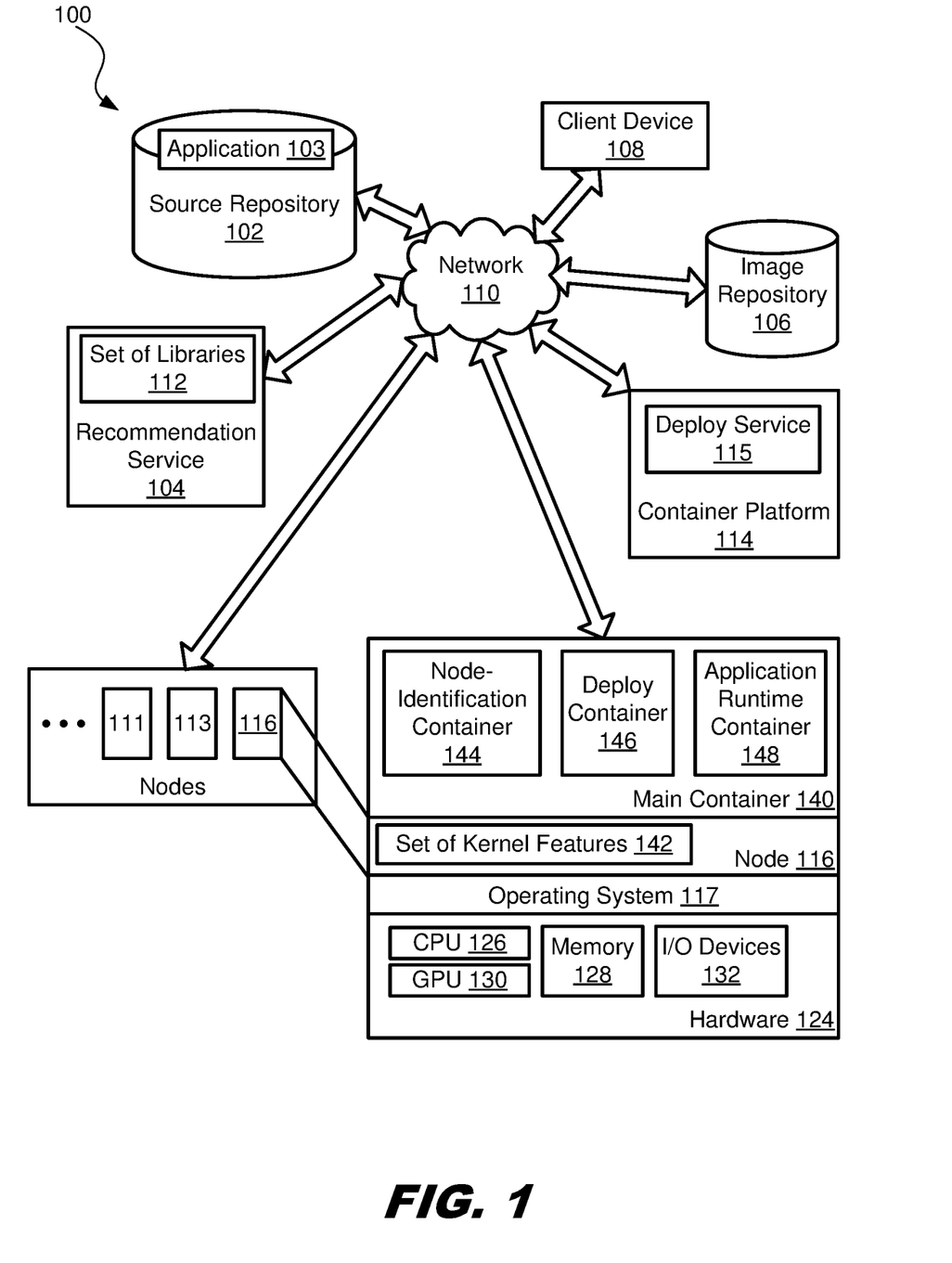
FIG. 1 is a diagram illustrating an example system for building an application for a hardware specification corresponding to a node.

FIG. 1 is a diagram illustrating an example system 100 for building an application for a hardware specification corresponding to a node. The system 100 includes a source repository 102, a recommendation service 104, an image repository 106, a client device 108, and a container platform 114 coupled over a network 110 (not shown). The network 110 may be a private network (e.g., local area network (LAN), wide area network (WAN), intranet, etc.), a public network (e.g., the Internet), or a combination thereof. The network 110 may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

The source repository 102 may store code for an application 103 that is deployable on a computing device. The source repository 102 may be a repository hosting service that stores source code of one or more applications 103. In an example, the source repository 102 is GITHUB®. The application 103 may have one or more application dependencies. An application dependency may refer to an external dependency of an application. An application dependency of an application may be another application, a library, an application programming interface (API), or any component from which the application depends.

The recommendation service 104 includes a set of libraries 112, which may include one or more application dependencies of one or more applications. In an example, the application 103 is a machine learning application that uses TensorFlow®, which is an open-source software library for dataflow and differentiable programming. Additionally, the image repository 106 stores one or more container images that are run on a container platform 114. The container platform 114 may be a container-based cloud service that connects different computer systems together. The container platform 114 may be installed on multiple physical hardware, and each application executing on the container platform 114 may run inside a container. The container platform 114 may operate at the operating-system level, and one or more nodes (e.g., nodes 111, 113, and/or 116) may run on the container platform 114.

A user may want to deploy the application 103 stored in the source repository 102. The client device 108 may send a request for the application 103 to be run on the container platform 114. The client device 108 may be, for example, a personal computer, a server, a game console, a set-top box, a kiosk, an embedded system, a workstation, a mobile device (e.g., a mobile phone, a personal digital assistant, a tablet, and a laptop), or other device having at least one processor and memory. The container platform 114 may receive the user's request to deploy the application 103. Before the application 103 is deployed, the container platform 114 creates a main container 140 on a node running on the container platform 114. A node may provide an environment in which one or more containers may be deployed. A container may include an entire runtime environment: an application, plus all its dependencies, libraries and other binaries, and configuration files to run it, bundled into one package. A container may run one or more applications on the local host, on physical or virtual machines in a data center, or in the cloud.

A node may be software running on top of an operating system 117. In an example, the container platform 114 exposes a deploy service 115 that may interact with the client device 108 via a user interface (UI). The deploy service 115 may send instructions to the client device 108 that cause the client device 108 to display a deploy button that is visible to the user. The user may request that the application 103 be deployed via the client device 108 by selecting the deploy button on the UI of the container platform 114. In response to receiving an indication that the user has selected the deploy button, the container platform 114 randomly selects a node from a plurality of nodes (e.g., node 111, 113, 116, etc.) and creates the main container 140 on the selected node. The container platform 114 may create the main container 140 on any node of the plurality of nodes (e.g., node 111, 113, 116, etc.). The main container 140 may include one or more containers and runs on the node 116.

The node 116 has a set of kernel features 142 that may be based on the operating system 117. The operating system 117 serves as a central component for facilitating communication between software application(s) (e.g., application 103) and hardware devices 124 of a machine. The operating system 117 may be responsible for facilitating operating system functions and various management tasks (e.g., process management, disk management, and memory management). For example, operating system 117 manages, organizes, and keeps track of files stored on a computer system that runs the operating system 117. The main container 140 may share the same kernel as the host machine. The set of kernel features 142 allows the main container 140 to interact with a set of physical hardware, which may be different from the hardware 124 included in the node 116.

The node 116 provides an abstraction of hardware 124, which includes a central processing unit (CPU) 126, a memory 128, and a graphics processing unit (GPU) 130. The hardware 124 may include other I/O devices 132 (e.g., a network interface card). The hardware 124 includes one or more CPUs 126 for executing software (e.g., machine-readable instructions) and using or updating data stored in the memory 128. The "CPU" may also be referred to as a "central processing unit," a "processor," or "physical processor" herein. A CPU 126 shall refer to a device capable of executing instructions encoding arithmetic, logical, or input/ output (I/O) operations. In an example, the CPU 126 may follow the Von Neumann architectural model and may include an arithmetic logic unit (ALU), a control unit, and a plurality of registers. In a further aspect, a CPU may be a single-core processor that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

The memory 128 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid-state drives typically have relatively larger storage volume but relatively slower performance. Other types of memory, such as those used for RAM, are optimized for speed and may be referred to as "working memory." The various types of memory may store information in the form of software and data.

If the container platform 114 randomly selects the node 116 on which the main container 140 is created, the container platform 114 may be unaware of the hardware included in the node. For example, each node of the plurality of nodes 111, 113, and 116 may abstract the same hardware as or different hardware from each other. The hardware 124 corresponding to the node 116 includes the GPU 130, but the other nodes 111 and 113 may or may not run on hardware including a GPU. The container platform 114 may be unaware of whether the node 116 has a CPU, a GPU, etc. If the node 116 includes a GPU, for example, it may be desirable to create a GPU-compatible container to host the application 103. In another example, if the node 116 includes a particular CPU type, it may be desirable to create a container that is compatible with the particular CPU type to host the application 103.

The present disclosure provides techniques for creating an application runtime container specific to the hardware 124 that is abstracted by the node 116 on which the main container 140 is created. The main container 140 includes logic to consider the hardware architecture corresponding to the node 116 (e.g., architecture of the CPU 126 and/or GPU 130, etc.), the size of the memory 128, the available network bandwidth, whether the Quality of Service (QoS) is available to run the application dependencies (e.g., libraries), etc.). The application runtime container may have kernel features that can support the hardware architecture on which the node 116 runs.

The container platform 114 may include internal logic to create the node-identification container 144, a deploy container 146, and an application runtime container 148 in the main container 140. The node-identification container 144 may communicate with the recommendation service 104 and determine and analyze first information, which may include the set of kernel features 142, a set of node features, an application stack of the application 103. An application stack of the application 103 includes the application 103 with its combinations of dependencies of the application 103. The node-identification container 144 may create, based on the first information, a builder image. Based on the builder image, the node-identification container 144 may create the deploy container 146.

The deploy container 146 communicates with the recommendation service 104 and determines an optimized application stack for the application 103, where the optimized application stack includes optimized application dependencies corresponding to the first information. The deploy container 146 builds, based on the optimized application stack, an application image and determines second information, which may include optimized dependencies that are based on the set of node features of the node 116, the set of kernel features 142, and the application stack of the application 103 (e.g., the application 103 and the different combinations of dependencies of the application 103). The deploy container 146 deploys, based on the build application image, an application runtime container 148. The application runtime container 148 may create, based on the build application image, a runtime application image that includes the optimized stack for the node 116. The node-identification container 144, the deploy container 146, and the application runtime container 148 will be discussed in further detail below.

Figure 2:
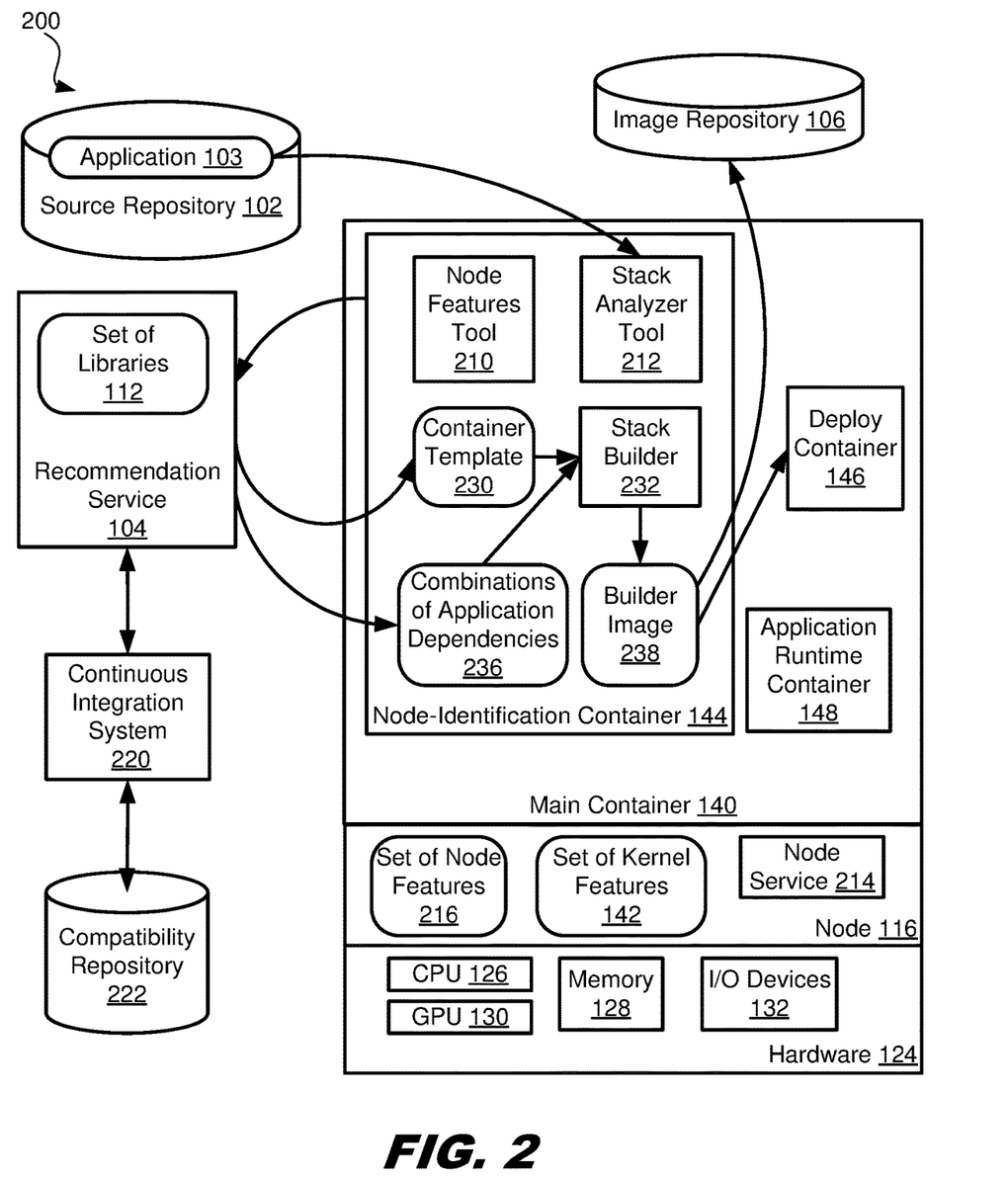
FIG. 2 is an example diagram illustrating a creation of a deploy container based on a builder image.

FIG. 2 is an example diagram illustrating a creation of a deploy container based on a builder image. In FIG. 2, the main container 140 includes the node-identification container 144, which includes a node features tool 210 and a stack analyzer tool 212. The node 116 includes a node service 214 that may expose one or more service endpoints. In an example, the node service 214 exposes an application programing interface (API), and the node features tool 210 invokes the API to extract a set of node features 216 of the node 116. In response to the API call, the node service 214 may retrieve node features of node 116 that abstracts the hardware 124 and may return these node features to the node features tool 210. An example of a node feature of the node 116 may include the GPU type and/or CPU type included in the node 116, the number of GPUs and/or the number of CPUs included in the node 116, the features of the CPU 126, the features of the GPU 130, how much memory the node 116 has (e.g., the size of the memory 128 or portions of the memory 128), etc.

The stack analyzer tool 212 may download the application 103 (e.g., download the source code of the application 103) stored in the source repository 102 and analyze an application stack of the application 103 to determine stack features of the application stack. The application stack may be deployed on the node 116 and may include the application 103 and a set of application dependencies of one or more applications (e.g., the application 103 and/or other applications). The stack analyzer tool 212 determines a set of dependencies of the application 103 and analyzes the dependencies to determine the application stack features. An example of stack features may include the application dependencies of the application 103, the level of the dependency (e.g., kernel-level dependencies (the GNU Compiler Collection (GCC) that is compatible with the kernel)), the kernel features that a dependency relies upon (e.g., a particular GCC), etc. The stack analyzer tool 212 may determine the actions to execute such that the kernel is compatible with the application dependencies. For example, if the stack analyzer tool 212 determines that a particular application dependency depends on a particular GCC, the stack analyzer tool 212 may check whether the particular GCC can support the CPU and/or GPU provided by the hardware 124.

For one or more dependencies (e.g., a dependency of the set of dependencies), the stack analyzer tool 212 recompiles the respective dependency such that the dependency is compatible with the application runtime container that will run the application 103. The stack analyzer tool 212 performs these actions step-by-step until the entire application stack of the application 103 works on the hardware architecture of the node 116.

The node-identification container 144 may determine the compatibility between the node 116 and the application 103. For example, the node-identification container 144 may have a representation of what is the best possible dependency version and the compiler version for the node 116 on which the main container 140 is running. The node-identification container 144 sends a request to the recommendation service 104, the request being a request for a list of compatible applications that can execute on the node 116 based on the set of node features and the application dependencies. The request may include the set of node features of the node 116 and the application stack features of the application 103.

The recommendation service 104 receives the request and analyzes the set of node features and the application stack features included in the request. In response to the request, the recommendation service 104 provides the node-identification container 144 with a file storing commands to build a container image that is capable of working on the node 116. In an example, the file is a DockerFile®, and the container image is a DockerImage®. For example, if the node 116 has a GPU, it may be desirable to have a GPU-compatible container to host the application 103.

The recommendation service 104 is coupled to a continuous integration system 220 that can build and install different application dependencies on different types of nodes/hardware. For example, the continuous integration system 220 may build a hundred different application dependencies on thirty or forty different combinations of hardware. From these builds, the recommendation service 104 may determine, for example, which dependencies are compatible with which hardware features, which dependencies are compatible with which compilers, which compilers are compatible with which kernels, which kernels can work on which CPUs or GPUs, etc. These combinations may be stored in a compatibility repository 222. In an example, the continuous integration system 220 may determine which combinations of application dependencies are compatible with each other. The recommendation service 104 may download the code (e.g., source code) for an application dependency into the continuous integration system 220 and compile the code on different components of a node (e.g., a GPU, CPU, etc.). For example, the code may be compiled on different GPUs or CPUs. If compilation of the code is successful on a component, the recommendation service 104 may determine that the code is compatible with the component. If the code is compatible, the code may be installed on the node, without error. If compilation of the code is not successful on the component, the recommendation service 104 may determine that the code is not compatible with the component. The node-identification container 144 may ensure that when an application makes internal method calls to one or more application dependencies, the call does not fail.

The recommendation service 104 receives the request for the list of compatible applications from the node-identification container 144 and searches, based on the set of node features of the node 116 and the application stack of the application 103, the compatibility repository 222 to identify a container template for the node 116. The recommendation service 104 may retrieve, based on the set of node features of the node 116 and the application stack features of the application 103, a container template 230 and send the container template 230 to the node-identification container 144. The recommendation service 104 may send the container template 230 as a payload in response to the request for the list of compatible applications.

The node-identification container 144 receives the container template 230 and creates, based on the container template 230, another container (e.g., the deploy container 146). The container template 230 may be, for example, a DockerFile®. The node-identification container 144 includes a stack builder 232 that consumes the container template 230 received from the recommendation service 104. The stack builder 232 may further analyze the application stack of the application 103. In an example, the stack builder 232 sends a request to the recommendation service 104, the request being a request for different combinations of application dependencies 236 compatible with the node 116, and the request including the set of kernel features 142. The combinations of application dependencies 236 may be based on the set of kernel features 142. In an example, the recommendation service 104 may identify, based on the set of kernel features 142, the different compatible combinations of application dependencies that work on the hardware 124. The stack builder 232 may determine the application dependencies and the available hardware that is available in the cloud and rebuild the application dependencies layer-by-layer.

The stack builder 232 consumes the container template 230 and the combination of application dependencies 236. The stack builder 232 creates, based on the container template 230 and the combination of application dependencies 236, a builder image 238. The stack builder 232 may store the builder image 238 into the image repository 106. At a later point in time, if the stack builder 232 is run on the same node 116 or on a different node and receives the container template 230 and the combination of application dependencies 236 from the recommendation service 104, the stack builder 232 may retrieve the builder image 238 from the image repository 106 instead of creating the builder image 238.

The main container 140 uses the builder image 238 to build an environment in which the application 103 may be built from scratch. The builder image 238 has a set of kernel-level features and compiler features that can successfully compile on the node 116 and run the application stack with the optimized bits. For example, to compile an application for a GPU (e.g., GPU 126), the builder image 238 has a GPU kernel and GPU features so that when the node-identification container 144 compiles the application for the GPU 126, the GPU compiler is available in the builder image. The stack builder 232 triggers the creation of the deploy container 146. The stack builder 232 may build the application 103 inside the deploy container 146. Based on the builder image 238, the node-identification container 144 creates the deploy container 146, which builds the application 103.

Figure 3:
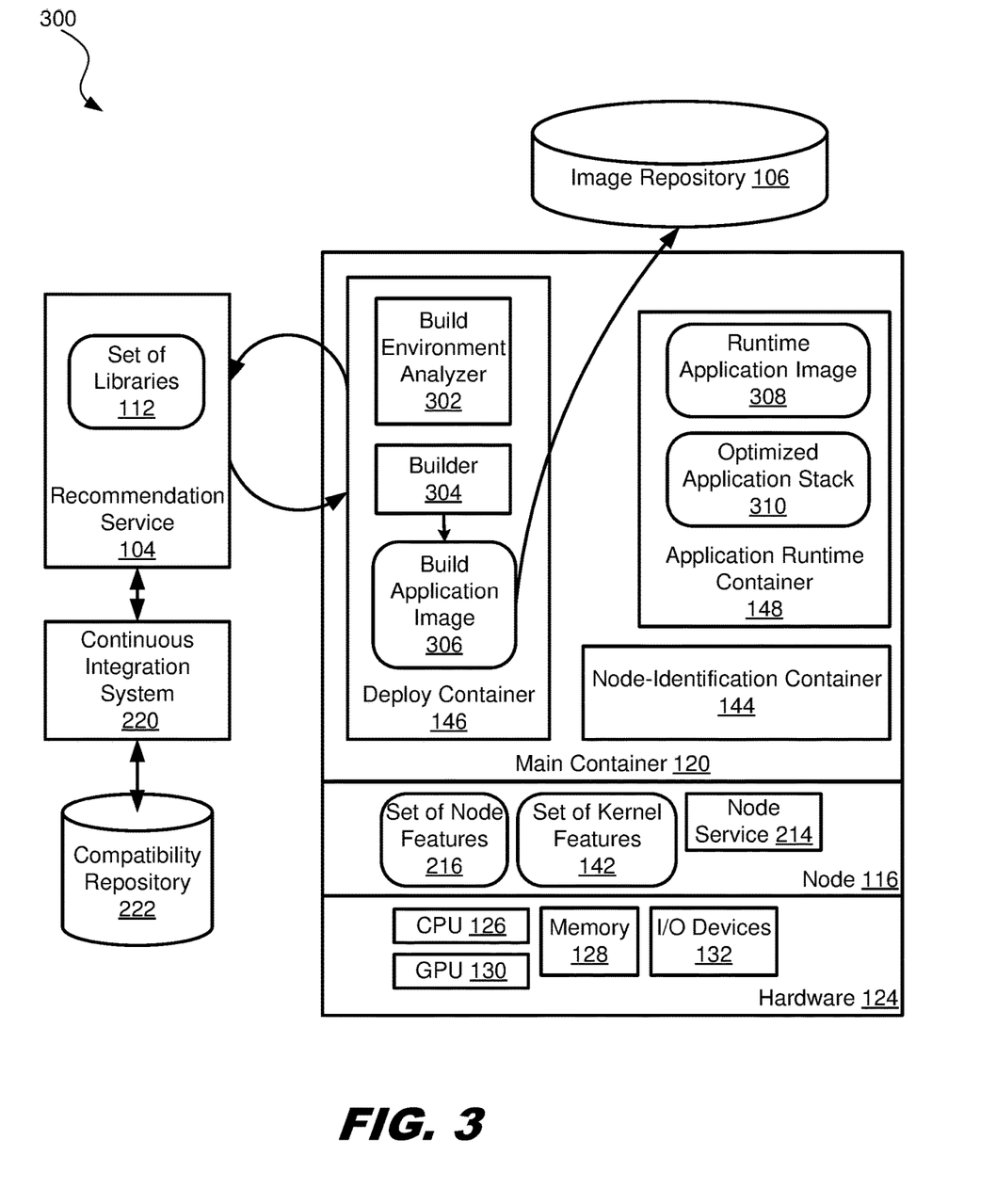
FIG. 3 is an example diagram illustrating a creation of an application runtime container in which an application is run.

FIG. 3 is an example diagram illustrating a creation of an application runtime container in which an application is run. In FIG. 3, the deploy container 146 is a container based on the builder image 238 and may also be referred to as a build image container. The deploy container 146 includes a build environment analyzer 302 and a builder 304. The build environment analyzer 302 may determine that the application will be built in an environment having the set of node features of the node 116. The build environment analyzer 302 analyzes the environment in which the application 103 will be built and sends a request to the recommendation service 104 for optimized libraries available for this build environment and set of node features that work for the application 103.

The builder 304 may build the application 103 and determine the application dependencies. In an example, the builder 304 optimizes the application dependencies of the application 103 by communicating with the recommendation service 104 to ensure that application dependencies are the best versions. The builder 304 may send a request to the recommendation service 104 for optimized libraries based on the description of the environment in which the application 103 will be built (e.g., the node features for the application 103) and the application dependencies of the application 103. The request may include a description of the environment in which the application 103 will be built, the node features of the node 116, and the application stack of the application 103. The builder 304 requests these optimized library components from the set of libraries 112 included in the recommendation service 104.

The recommendation service 104 receives the request for the optimized libraries and may interact with the continuous integration system 220 to search the compatibility repository 222 for optimized libraries corresponding to the application 103 and its application dependencies. The continuous integration system 220 builds different versions of dependencies on different nodes and stores the results into the compatibility repository 222. The recommendation service 104 may send the optimized libraries to the builder 304.

The builder 304 receives the optimized application dependencies. Based on the optimized application dependencies, the builder 304 builds the application stack of the application 103. For example, if the node 116 includes a GPU, the builder 304 ensures that the dependency is GPU compatible. The builder 304 may send a request for a TensorFlow library that is compatible with the GPU 126 to the recommendation service 104, which provides the requested TensorFlow library to the builder 304. In another example, if the node has a CPU of a first type having a set of optimization features, this set of optimization features may be used if the applications 103 is compiled on the CPU of the first type, by enabling some options in the compiler when the application is compiled. The recommendation service 104 retrieves the library or a particular version of the library which is able to use that particular feature of the CPU of the first type and returns the retrieved library to the builder 304. For example, the recommendation service 104 may provide a link to the builder 304 that when selected, installs the optimized bits on the node 116. In an example, the builder 304 may send a request for a library that is compatible with the set of optimization features of the CPU of the first type to the recommendation service 104, which provides the requested library to the builder 304.

The builder 304 continues building the application 103 and creates, based on the optimized libraries received from the recommendation service 104, a build application image 306. In an example, the builder 304 installs one or more optimized libraries into the build application image 306, which is compatible with the node 116. The builder 304 pushes the build application image 306 into the image repository 106. The build application image 306 may be used for a next deployment of the application 103 or for another application having the same or a similar stack as the application 103. In this example, for the next deployment of the application 103 or for another application having an application stack similar to or the same as the application 103, rather than go through the actions for creating the builder image 238, the builder 304 may retrieve the build application image 306 from the image repository 106. The stack builder 232 may fetch the builder image 238 from the image repository 106 and use the fetched builder image 238 to create the deploy container 146. Accordingly, if the stack builder 232 is run on the same node 116 or a different node and receives the container template 230 and the combination of application dependencies 236 from the recommendation service 104, the stack builder 232 may retrieve the builder image 238 from the image repository 106 instead of creating the builder image 238.

An application may be deployed in an environment where the number of runtime dependencies are far fewer than the number of build-time dependencies. It may be desirable to deploy the application 103 in an environment where the runtime dependencies consume less space than the build-time dependencies. In some examples, the builder 304 creates, based on the build application image 306, the runtime application image 308. In some examples, the builder 304 compiles the application 103 in the deploy container 146 and generates, based on the compilation, an application binary of the application 103. In an example, the builder 304 creates the application runtime container 148 for deploying the application binary, fetches a runtime application image 308 corresponding to the build application image 306, and pushes the application binary into the runtime application image 308. The application runtime container 148 includes an optimized application stack 310 of the application 103 for the node 116.

The optimized application stack 310 is based on the runtime application image 308. The application runtime container 148 may push the runtime application image 308 into the image repository 106 for later retrieval. The runtime application image 308 may be used for a next deployment of the application 103 or for another application having the same or a similar stack as the application 103. In this example, for the next deployment of the application 103 or for another application having an application stack similar to or the same as the application 103, rather than go through the actions for creating the runtime application image 308, application runtime container 148 may retrieve the runtime application image 308 from the image repository 106. The application runtime container 148 may use the fetched runtime application image 308 to run the application 103.

The application runtime container 148 is a container that is specific to the hardware 124 that is abstracted by the node 116. Each of the application dependencies may be compatible with the application runtime container 148. The main container 140 may install the application 103 in the application runtime container 148, and the application runtime container 148 is a container that runs the application 103 in an optimized manner on the node 116.

Figure 4:
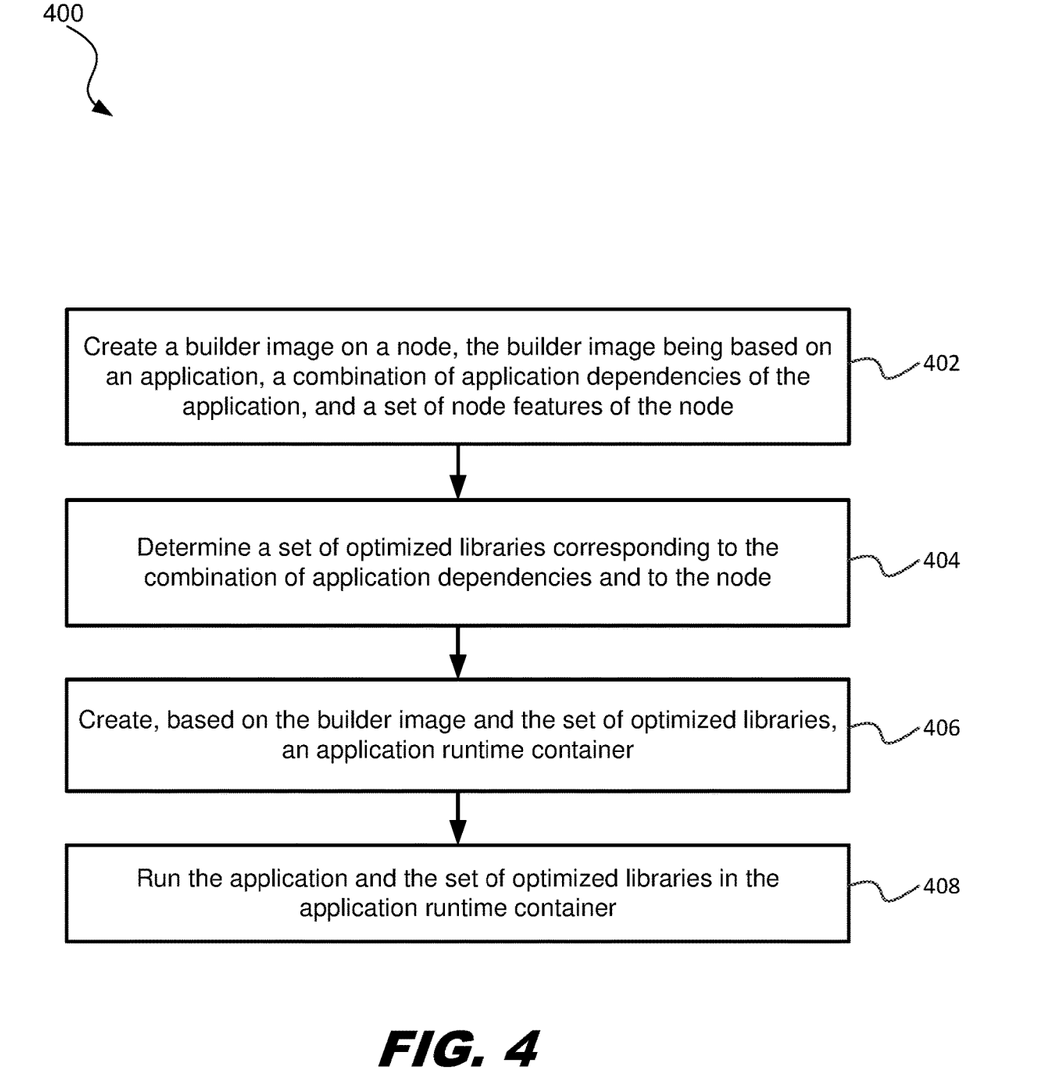
FIG. 4 is a flowchart illustrating an example method of creating an application stack.

FIG. 4 is a flowchart illustrating an example method 400 of creating an application stack. Blocks of the method 400 can be executed by a computing device (e.g., a processor, processing circuit, and/or other suitable component) or other suitable means for executing or performing the blocks. For example, a container platform, a node, or a main container running on the node, may utilize one or more components, such as the CPU 126, the memory 128, or the GPU 130, to execute the blocks of method 400. As illustrated, the method 400 includes a number of enumerated blocks, but examples of the method 400 may include additional blocks before, after, and in between the enumerated blocks. In some examples, one or more of the enumerated blocks may be omitted or performed in a different order.

At block 402, the method 400 includes creating a builder image on a node, the builder image being based on an application, a combination of application dependencies of the application, and a set of node features of the node. At block 404, the method 400 includes determining a set of optimized libraries corresponding to the combination of application dependencies and to the node. At block 406, the method 400 includes creating, based on the builder image and the set of optimized libraries, an application runtime container. At block 408, the method 400 includes running the application and the set of optimized libraries in the application runtime container.

It is understood that additional blocks may be performed before, during, or after blocks 402, 404, 406 and/or 408 discussed above. As discussed above and further emphasized here, FIGS. 1-4 are merely examples, which should not unduly limit the scope of the claims.

Figure 5:
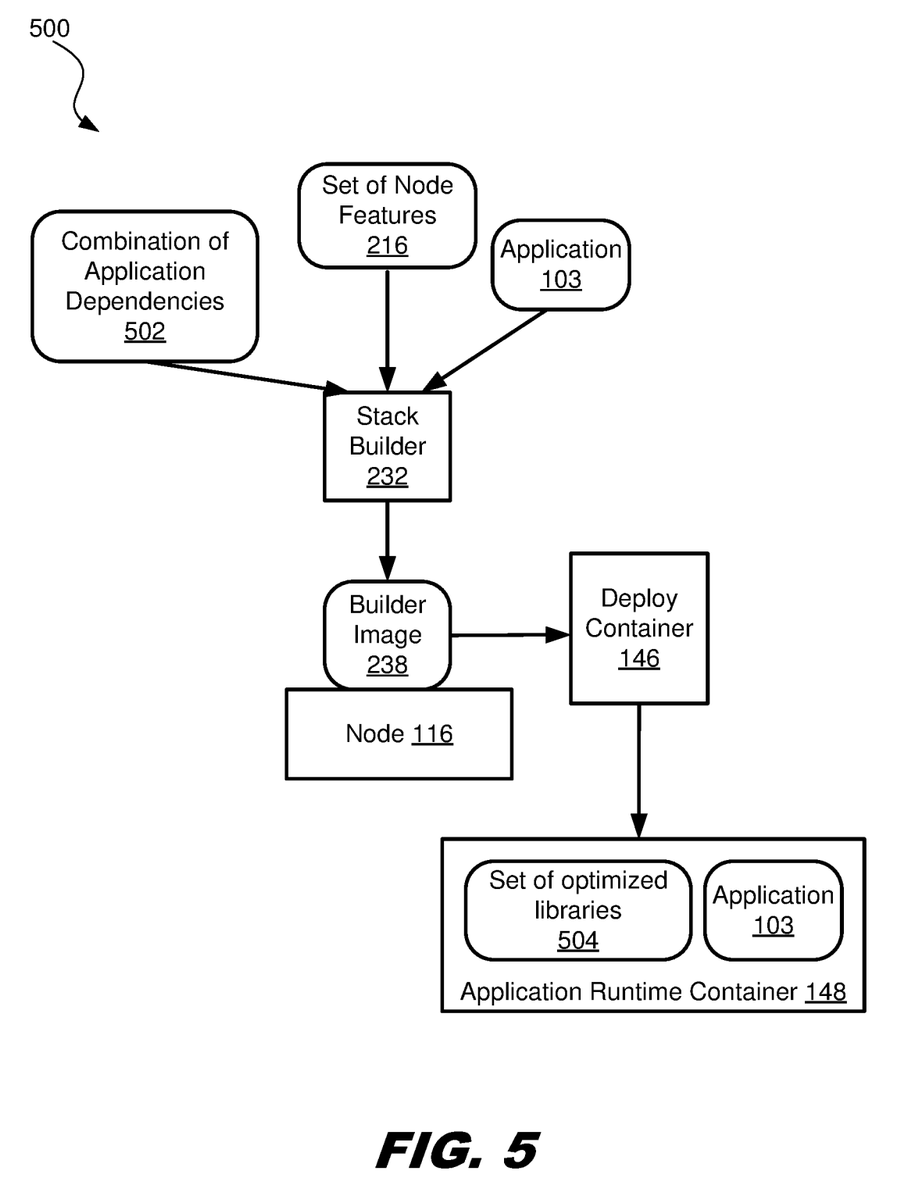
FIG. 5 is a block diagram illustrating an example system for building an application for a hardware specification corresponding to a node.

FIG. 5 is a block diagram illustrating an example system 500 for building an application for a hardware specification corresponding to a node. In FIG. 5, the stack builder 232 creates the builder image 238 on the node 116. The builder image 238 is based on the application 103, a combination of application dependencies 502 of the application 103, and the set of node features 216 of the node 116. The deploy container 146 determines a set of optimized libraries 504 corresponding to the combination of application dependencies and to the node 116. The set of optimized libraries may correspond to the optimized application stack 310. Additionally, the deploy container 146 creates, based on the builder image 238 and the set of optimized libraries, the application runtime container 148. The application runtime container 148 runs the application 103 and the set of optimized libraries in the application runtime container 148.

Figure 6:
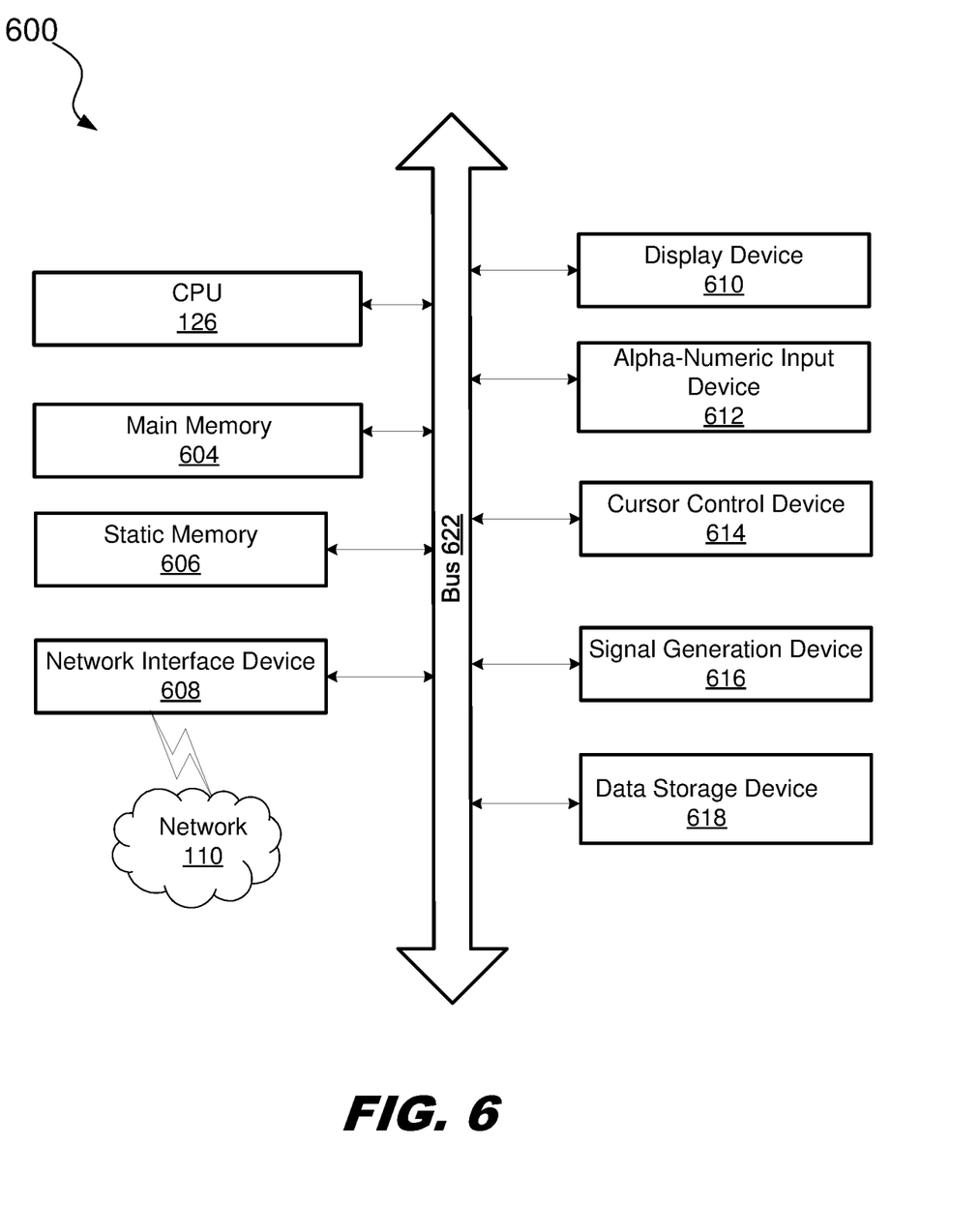
FIG. 6 is a block diagram of a computer system suitable for implementing one or more examples of the present disclosure.

FIG. 6 illustrates a system diagram of a machine 600 within which a set of instructions, for causing the machine to perform any one or more of the methodologies discussed herein, may be executed in the example form of a computer system coupled to the hardware 124, the node 116, the container platform 114, and/or the main container 140. The machine 600 may be connected (e.g., networked) to other machines in a local area network (LAN), an Intranet, an extranet, or the Internet. The machine 600 may operate in the capacity of a server or a client machine in a client-server network environment, or as a peer machine in a peer-to-peer (or distributed) network environment. The machine 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, the machine 600 includes the CPU 126, main memory 604, static memory 606, and a data storage device 618, which communicate with each other via a bus 622. The CPU 126 represents one or more general-purpose processing devices such as a microprocessor, or the like. More particularly, the CPU 126 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The CPU 126 may also be one or more special-purpose processing devices such as an application specific integrated circuit (ASIC), a field programmable gate array (FPGA), a digital signal processor (DSP), a network processor, or the like. The CPU 126 is configured to execute instructions for performing the operations, actions, and steps discussed herein (e.g., the method 400 discussed in relation to FIG. 4).

The memory may be one or more of many different types of memory. The various types of memory may store information in the form of software and data. The software may include the operating system 117 and various other software applications. Main memory 604 may be, for example, ROM, flash memory, dynamic random-access memory (DRAM) such as synchronous DRAM (SDRAM), double data rate (DDR SDRAM), or DRAM (RDRAM), and so forth. Static memory 606 may be, for example, flash memory, static random-access memory (SRAM), and so forth.

The machine 600 may further include a network interface device 608, an alphanumeric input device 612 (e.g., a keyboard) that accepts input from a user, a cursor control device 614 (e.g., a mouse) that accepts input from a user, a signal generation device 616 (e.g., a speaker), and a display device 610. In an example, the client device 108 may provide via the input device 612 user input that causes the main container 140 to be created and the application 103 run inside the main container 140.

The display device 610 may be a physical display device that displays data processed by the machine 600. The physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display, or another type of display unit. The display may be physically attached to the machine 600 or separate from and physically coupled via a wired or wireless connection to the machine 600. In an example, the display device 610 is part of, and integrated into, the machine 600 (e.g., a screen of the computing system and/or the client device). The display device 610 may be sold with and attached to the computing system and/or the client device such that when a user views content via the computing system and/or the client device, the content is displayed on the display device 610. It will be appreciated that other physical display devices are contemplated, and that the various types named herein are not limiting.

The data storage device 618 may include a computer-readable storage medium that stores one or more sets of instructions (e.g., software) embodying any one or more of the methodologies or functions described herein. The instructions may also reside, completely or at least partially, within main memory 604 and/or within the CPU 126 during execution thereof by the machine 600. Additionally, the main memory 604 and the CPU 126 may also constitute computer-readable storage media. The instructions may further be transmitted or received over the network 110 via the network interface device 608. While the data storage device 618 is shown in an example to be a single medium, the term "data storage device" should be taken to include a single medium or multiple media (e.g., a centralized or distributed database, and/or associated caches and servers) that store the one or more sets of instructions. The term "computer-readable storage medium" may also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. The steps or actions are those causing physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative examples have been shown and described, a wide range of modification, change, and substitution is contemplated in the foregoing disclosure and in some instances, some features of the disclosure may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the disclosure disclosed herein.

We claim:

1. A method, comprising:
determining a set of node features of a node executable on a computer system, wherein a node feature of the set of node features specifies a first hardware component that is abstracted by the node;
determining application dependencies of an application;
creating a builder image on the node, the builder image being based on the application, a combination of the application dependencies of the application, and the set of node features, wherein the application and the application dependencies are compatible with the first hardware component;
determining a set of optimized libraries corresponding to the combination of application dependencies and to the node;
creating, based on the builder image and the set of optimized libraries, an application runtime container, wherein the application runtime container has a set of kernel features that supports the first hardware component; and
running the application and the set of optimized libraries in the application runtime container.

2. The method of claim 1, further comprising:
compiling a first application dependency of the combination of application dependencies;
determining whether compilation of the first application dependency is successful on the node; and
in response to a determination that the first application dependency is successful on the node, installing the compiled first application dependency on the node.

3. The method of claim 1, further comprising:
receiving a request to deploy the application stored in a source repository; and
creating a main container on the node running on a container platform, the node providing an environment in which one or more applications are deployed.

4. The method of claim 1, further comprising:
sending a request for a list of compatible applications executable on the node, the list of compatible applications being based on the set of node features and the application dependencies; and
receiving a container template in response to the request for the list of compatible applications.

5. The method of claim 4, further comprising:
creating, based on the container template, a deploy container;
running a build application image in the deploy container, the build application image being based on the builder image and including the set of optimized libraries; and
optimizing the application dependencies of the application, the optimized application dependencies including the set of optimized libraries.

6. The method of claim 5, further comprising:
sending a second request for different combinations of application dependencies compatible with the node, the second request including the set of kernel features corresponding to an operating system that interfaces with the node.

7. The method of claim 1, wherein the application runtime container is specific to the hardware component that is abstracted by the node.

8. A system, comprising:
a non-transitory memory;
one or more hardware processors coupled to the non-transitory memory and that execute instructions to cause the system to perform operations comprising:
with a node-identification container, determining a set of node features of a node executable on a computer system and determining application dependencies of an application, wherein a node feature of the set of node features specifies a first hardware component that is abstracted by the node;
with a stack builder, creating a builder image on the node, wherein the builder image is based on the application, a combination of the application dependencies of the application, and the set of node features, wherein the application and the application dependencies are compatible with the first hardware component;
with a deploy container, determining a set of optimized libraries corresponding to the combination of application dependencies and to the node; and
with an application runtime container, running the application and the set of optimized libraries in the application runtime container, wherein the deploy container creates, based on the builder image and the set of optimized libraries, the application runtime container, wherein the application runtime container has a set of kernel features that supports the first hardware component.

9. The system of claim 8, further comprising:
a source repository for storing source code of the application.

10. The system of claim 8, further comprising:
a node-identification container including a node features tool and a stack analyzer tool, wherein the node features tool determines the set of node features of the node, and the stack analyzer tool determines the application dependencies of the application.

11. The system of claim 10, wherein the node-identification container sends a request for a list of compatible applications executable on the node, the list of compatible applications being based on the set of node features and the application dependencies, and wherein the node-identification container receives a container template in response to the request for the list of compatible applications.

12. The system of claim 11, wherein the node-identification container includes the stack builder, and the stack builder creates, based on the container template, the deploy container.

13. The system of claim 8, wherein the deploy container includes a build environment analyzer and a builder, wherein the build environment analyzer determines an environment in which the application is built, and the builder optimizes the application dependencies of the application.

14. The system of claim 8, wherein the stack builder sends a request for different combinations of application dependencies compatible with the node, and the request includes the set of kernel features corresponding to an operating system that interfaces with the node.

15. A non-transitory machine-readable medium comprising a plurality of machine-readable instructions that when executed by one or more processors is adapted to cause the one or more processors to perform a method comprising:
determining a set of node features of a node executable on a computer system, wherein a node feature of the set of node features specifies a first hardware component that is abstracted by the node;
determining application dependencies of an application;
creating a builder image on the node, the builder image being based on the application, a combination of the application dependencies of the application, and the set of node features, wherein the application and the application dependencies are compatible with the first hardware component;
determining a set of optimized libraries corresponding to the combination of application dependencies and to the node;
creating, based on the builder image and the set of optimized libraries, an application runtime container, wherein the application runtime container has a set of kernel features that supports the first hardware component; and
running the application and the set of optimized libraries in the application runtime container.

16. The non-transitory machine-readable medium of claim 15, the method including:
compiling a first application dependency of the combination of application dependencies;
determining whether compilation of the first application dependency is successful on the node; and
in response to a determination that the first application dependency is successful on the node, installing the compiled first application dependency on the node.

17. The non-transitory machine-readable medium of claim 15, the method including:
receiving a request to deploy the application stored in a source repository; and
creating a main container on the node running on a container platform, the node providing an environment in which one or more applications are deployed.

18. The non-transitory machine-readable medium of claim 15, the method including:
sending a request for a list of compatible applications executable on the node, the list of compatible applications being based on the set of node features and the application dependencies; and
receiving a container template in response to the request for the list of compatible applications.

19. The non-transitory machine-readable medium of claim 18, the method including:
creating, based on the container template, a deploy container;
running a build application image in the deploy container, the build application image being based on the builder image and including the set of optimized libraries; and
optimizing the application dependencies of the application, the optimized application dependencies including the set of optimized libraries.

20. The non-transitory machine-readable medium of claim 19, the method including:
sending a second request for different combinations of application dependencies compatible with the node, the second request including the set of kernel features corresponding to an operating system that interfaces with the node.

* * * * *